United States Patent [19]

Ogawa et al.

[11] Patent Number: 5,686,137
[45] Date of Patent: Nov. 11, 1997

[54] METHOD OF PROVIDING HEXAGONAL FERRITE MAGNETIC POWDER WITH ENHANCED COERCIVE FORCE STABILITY

[75] Inventors: Etsuji Ogawa; Osamu Kubo; Shunji Kurisu; Tatsumi Maeda, all of Kanagawa-ken, Japan

[73] Assignee: Kabushiki Kaisha Toshiba, Kanagawa-ken, Japan

[21] Appl. No.: 621,330

[22] Filed: Mar. 25, 1996

Related U.S. Application Data

[63] Continuation of Ser. No. 266,347, Jul. 1, 1994, abandoned, which is a continuation-in-part of Ser. No. 915,831, filed as PCT/JP92/00212, Feb. 27, 1992, abandoned.

[30] Foreign Application Priority Data

Feb. 27, 1991 [JP] Japan .................................. 3-311654
Feb. 26, 1992 [JP] Japan .................................... 4-38267

[51] Int. Cl.$^6$ .................................................. G11B 5/712
[52] U.S. Cl. ..................... 427/128; 324/200; 324/204; 428/402; 428/694 BH; 428/900
[58] Field of Search .................. 427/128; 324/200, 324/262, 204; 428/402, 694 BH, 900

[56] References Cited

U.S. PATENT DOCUMENTS

| | | | |
|---|---|---|---|
| 4,770,933 | 9/1988 | Kitahata et al. | 428/323 |
| 4,781,981 | 11/1988 | Katamoto et al. | 428/403 |
| 4,828,916 | 5/1989 | Yamamoto et al. | 428/329 |
| 4,837,092 | 6/1989 | Yokoyama et al. | 428/694 |
| 4,952,463 | 8/1990 | Atsushi | 428/552 |
| 5,055,322 | 10/1991 | Yamamoto et al. | 427/128 |
| 5,059,469 | 10/1991 | Hashimoto et al. | 428/141 |
| 5,062,983 | 11/1991 | Yamamoto et al. | 252/62.57 |
| 5,078,984 | 1/1992 | Iwasaki et al. | 423/594 |
| 5,354,610 | 10/1994 | Ozawa et al. | 428/323 |
| 5,358,660 | 10/1994 | Kidoh et al. | 252/62.63 |

*Primary Examiner*—Stevan A. Resan
*Attorney, Agent, or Firm*—Finnegan, Henderson, Farabow, Garrett & Dunner, L.L.P.

[57] ABSTRACT

An object of the present invention is to provide a magnetic powder for magnetic recording and a magnetic recording medium wherein stability of a coercive force of each of the magnetic powder and the magnetic recording medium is improved.

The magnetic powder for magnetic recording and the magnetic recording medium having the magnetic powder used therfor are characterized in that the magnetic powder is composed mainly of a plate-shaped ferrite having a crystal-line anisotropy and containing an element effective for reducing a temperature coefficient of coercive force of the magnetic powder, and that a difference between a coercive force (Hc) of the magnetic powder at a room temperature and a coercive force (Hc(s)) of the magnetic powder in such a state that the magnetic powder is dispersively deposited on the surface of silica (SiO$_2$) powder particles is 100 (Oe) or less.

10 Claims, No Drawings

METHOD OF PROVIDING HEXAGONAL FERRITE MAGNETIC POWDER WITH ENHANCED COERCIVE FORCE STABILITY

This application is a continuation of application Ser. No. 08/266,347 filed Jul. 1, 1994, now abandoned, which is a continuation-in-part of application Ser. No. 07/915,831, filed as PCT/JP92/00212, Feb. 27, 1992, now abandoned.

TECHNICAL FIELD

The present invention relates to a magnetic powder for magnetic recording and a magnetic recording medium having the magnetic powder used therefor.

BACKGROUND ART

A coated type magnetic recording medium is constructed of a non-magnetic supporting substrate molded of, e.g., polyethylene terephthalate or the like and a magnetic layer which is composed mainly of amagnetic powder and a resin binder and is deposited on the supporting substrate. A needle-shaped magnetic powder such as $\gamma\text{-}Fe_2O_3$, $CrO_2$, $Co\text{-}\gamma\text{-}Fe_2O_3$ or the like has been widely used as a magnetic powder of the aforementioned type. In recent years, to assure that a recording density of each magnetic recording medium is substantially improved, a magnetic recording medium having a hexagonal ferrite, magnetic powder used therefor has been developed as a magnetic recording medium which makes it possible to practice a perpendicular magnetic recording system. In addition, the aforementioned magnetic recording medium is increasingly put in practical use.

With respect to the magnetic recording medium as mentioned above, it is required that its coercive force is kept stable in order to guarantee reliability of the magnetic recording medium.

So, it is required from the following two viewpoints that the magnetic recording medium has stability.

One of the two viewpoints of the stability is that a coercive force of the magnetic powder is stable against variation of the environmental temperature, i.e., a temperature coefficient of coercive force ($\delta$ Hc) of the magnetic powder is kept stable. Hereinafter, $\delta$ Hc represents a temperature coefficient of coercive force.

An M type (magnetoplumbite type) ferrite in which Co and Ti are substituted for a part of Fe is practically used as a hexagonal ferrite magnetic powder employable for performing a magnetic recording at a high density. And, the coercive force of the M type ferrite is reduced by introducing Co—Ti as the substitution system to such a level that writing and erasing can be effected with the use of a general-purposed magnetic head. However, $\delta$ Hc of the coercive force can not be reduced merely by the introduction of Co—Ti within the range where the coercive force, saturation magnetization or a shape of each particle are not adversely affected.

The other of the two viewpoints of the stability is that continuous variation of the coercive force of the magnetic recording medium is kept stable in such a state that it is reserved in, e.g., an environment having a high temperature and a high moisture, i.e., variation ($\Delta$ Hc) of the coercive force of the magnetic recording medium with time is kept stable. Hereinafter, $\Delta$ Hc represents time variation of the coercive force.

In practice, it becomes possible for a magnetic recording medium to realize not only an excellent recording performance at high density magnetic recording but also high reliability, only when a coercive force of a magnetic recording medium has the aforementioned two kinds of stability.

In the circumstances as mentioned above, intense requests have been raised from users for developing a magnetic powder having high stability in respect of a coercive force or a magnetic recording medium having high stability in respect of a coercive force.

The present invention has been made in consideration of the foregoing background and its object resides in providing a magnetic powder for magnetic recording and a magnetic recording medium each of which stability of the coercive force is improved.

SUMMARY OF THE INVENTION

One of the objects of the present invention is to provide a magnetic recording medium and magnetic particles having a stable coercive force, in that coercive force does not vary even after long-term storage or use under abnormal conditions such as high humidity and/or high temperature, and having a low thermal coefficient of coercive force. Applicants had found that time variation ($\Delta H_c$) of coercive force $H_c$ relates to the difference between the coercive force $H_c(s)$ which represents a value nearly equal to intrinsic coercive force of magnetic particles and the coercive force $H_c$ of magnetic particles which are affected by interaction between magnetic particles. Namely, in order to select magnetic particles having a small time variation of coercive force $H_c$, it is a necessary condition to select magnetic particles having a small difference between the coercive force $H_c(s)$ and the coercive force $H_c$. Even if a composition or shape of magnetic particles is similar, it is impossible to obtain magnetic particles and a magnetic recording medium incorporating the magnetic particles therein which have small time variations of coercive force under long-term storage or use, without consideration of the difference between the coercive force $H_c(s)$ and the coercive force $H_c$.

The present invention provides a magnetic powder for magnetic recording which is characterized in that the magnetic powder is composed mainly of a plate-shaped ferrite having crystalline anisotropy and containing an element effective for reducing a temperature coefficient of coercive force, and that a difference between a coercive force (Hc) of the magnetic powder at a room temperature and a coercive force (Hc(s)) of the magnetic powder in such a state that the magnetic powder is dispersively deposited on the surface of silica ($SiO_2$) powder particles is 100 (Oe) or less. Hereinafter, Hc represents a coercive force of the magnetic powder at a room temperature, and Hc(s) represents a coercive force of the magnetic powder dispersively deposited on the surface of silica powder particles that is, the coercive force of magnetic particles relatively isolated or not significantly affected by interaction with other magnetic particles.

The fine silica particles as mentioned above are fine particles having an average particle size within the range of 0.1 to 5 μm, and is larger than the magnetic powder for magnetic recording. And, Hc(s) represents a value which has been obtained by way of steps of dispersing the magnetic powder in water, immovably depositing it on the surface of silica ($SiO_2$) powder particles, drying both the materials, and thereafter, measuring their coercive force.

In addition, it is necessary that a ratio of the total quantity of silica ($SiO_2$) powder particles to the total quantity of magnetic powder particles is set such that the total sum of surface area of the silica ($SiO_2$) powder particles is sufficiently larger than the total sum of adherent surface area of the magnetic powder particles to the silica ($SiO_2$) powder particles.

When the magnetic powder is dispersively deposited on the surface of silica powder particles, the magnetic powder particles are individually separated by the fine silica particles, and successively, this state is maintained. Thus, the coercive force of the magnetic powder held in such a state that the respective magnetic powder particles are kept isolated without any influence attributable to aggregation among the magnetic powder particles can be measured.

Hc(s) was described in, e.g., "T. Ido, O. Kubo and H. Yokoyama, IEEE Trans. on Magn., MAG-22, NO. 5, 704, 1986".

The interaction appearing among magnetic powder particles which is considered to have a significant effect on $\Delta$ Hc of a magnetic recording medium can be measured by measuring a difference between Hc of the magnetic powder and Hc(s) of the same.

According to the present invention, when the difference between Hc of a magnetic recording powder and Hc(s) of the same is 100 (Oe) or less, the magnetic recording medium having small $\Delta$ Hc can be obtained.

A metallic element such as Zn, Ni, Sn, Cu, Zr, In or the like and a combination among these metallic elements can be noted as an element effective for reducing a temperature coefficient of coercive force of a plate-shaped ferrite having crystalline anisotropy. Especially, in case that at least one kind of metallic element selected from a group consisting of Zn, Ni and Sn is used as an element for reducing a temperature coefficient of coercive force, $\delta$ Hc can be reduced without any enlargement of the difference between Hc and Hc(s) (that is ($\Delta$ Hc)).

Especially, a hexagonal ferrite is preferably employable as a magnetic powder for magnetic recording according to the present invention. The hexagonal ferrite has an easy magnetization axis which is perpendicular relative to the plate plane of a plate-shaped crystal. For this reason, high density recording can be accomplished by utilizing the perpendicular magnetization.

For example, a M type or a W type hexagonal Ba ferrite, Sr ferrite, Pb ferrite, a ferrite in which Ca is substituted for a part of Ba, Sr and Pb, a solid solution of these ferrites or an ion substituted ferrite of the same and the like can be noted as a hexagonal ferrite magnetic powder employable for carrying out the present invention.

The hexagonal system based ferrite is represented by the following general formula

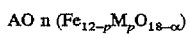
AO n ($Fe_{12-p}M_pO_{18-\alpha}$)

(It should be noted that A designates at least one kind of metallic element selected from a group consisting of Ba, Sr, Pb and Ca, M designates at least one kind of metallic selement selected from a group consisting of a divalent metallic element to a hexavalent metallic element, P designates a substitution quantity per a single chemical formula that is a numeral of 0 or more, n designates a numeral of 0.7 to 4 and $\alpha$ designates a numeral of 0 or more).

It is preferable that the magnetic powder for magnetic recording according to the present invention is such that a specific metallic element is substituted for a part of Fe. For example, a magnetic powder as represented by the following formula, in which a specific metallic element is substituted for a part of Fe, is preferably employable.

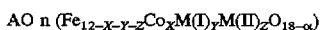
AO n ($Fe_{12-X-Y-Z}Co_XM(I)_YM(II)_ZO_{18-\alpha}$)

(It should be noted that A designates at least one kind of metallic element selected from a group consisting of Ba, Sr, Pb and Ca, M(I) designates at least one kind of element selected from Zn and Ni, M(II) designates at least one kind of metallic element selected from a quadrivalent metallic element to a hexavalent metallic element, X, Y, Z designate a substitution quantity per a single chemical formula of Co, M(I), M(II), respectively, n designates a numeral of 0.7 to 4 and $\alpha$ designates a numeral of 0 or more.)

In this case, when it is assumed that X is 0 or more to 0.7 or less, y is 0.5 or more to 2.0 or less, and Z is a numeral greater than 0 and in a range representing an atomic proportion of the referenced element for compensating or partially compensating an atomic proportion of a formula constituent having an ionic valence the difference between Hc and Hc(s) can comparatively easily be reduced, and therefore, $\Delta$ Hc can be reduced too.

In addition, when specific metallic elements inclusive of Co are substituted for a part of Fe, $\delta$ Hc can easily be controlled without substantial reduction of the saturation magnetization compared with the case that Co is not substituted for a part of Fe.

Incidentally, Ti, Zr, Hf, Sn or the like can be noted as a quadrivalent metallic element, Nb, Sb, Ta, V or the like can be noted as a pentavalent metallic element, and W, Mo or the like can be noted as a hexavalent metallic element.

When the aforementioned magnetic powder for magnetic recording is a M type, $\alpha$ becomes zero, and the substitution quantity Z of M(II) is determined such that an ionic valence is compensated. For example, if M(II) is selected only from quadrivalent metallic elements, the substitution quantity Z becomes X+Y, if the M(II) is selected only from pentavalent metallic elements, the substitution quantity Z becomes (X+Y)/2, and if the M(II) is selected only from hexavalent metallic elements, the substitution quantity Z becomes (X+Y)/3. With respect to the M-type magnetic powder for magnetic recording, it is recommendable to adjust each of the above substitution quantities X and Y such that X becomes larger than 0 but 0.5 or less, and moreover, Y becomes 0.5 or more to 1.5 or less. Consequently, $\Delta$ Hc can sufficiently be reduced without significant reduction of the saturation magnetization by adjusting the substitution quantities in that way while maintaining $\delta$ Hc at a low level.

The magnetic power for magnetic recording according to the present invention can be produced by employing a hitherto known process such as a glass crystallization method, a hydrothermal synthesis process, a coprecipitation process or the like. But it is difficult to obtain a magnetic powder for magnetic recording according to the present invention without intending and taking affirmative action to control the relationship between $H_c$ and $H_c(s)$ of the magnetic powder.

For example, the magnetic powder of Comparative Example 8, below, was prepared essentially in accordance with example 10 of U.S. Pat. No. 4,781,981. The value of the difference between $H_c$ and $H_c(s)$ is larger than 100 Oe and indicative of the likelihood that it will not retain a stable coercivity over long periods of storage or use.

The magnetic powder of Comparative Example 9 was prepared essentially in accordance with example 1 of U.S. Pat. No. 4,828,916. The value of the difference between $H_c$ and $H_c(s)$ is larger than 100 Oe and indicative of the likelihood that it will not retain a stable coercivity over long periods of storage or use.

The magnetic powder of Comparative Example 10 was prepared essentially in accordance with example 1 of U.S. Pat. No. 4,770,933. The value of the difference between $H_c$ and $H_c(s)$ is larger than 100 Oe and indicative of the likelihood that it will not retain a stable coercivity over long periods of storage or use.

With respect to the intent and affirmative action mentioned above, it is desirable to attend to not only the composition of the powder, but also to attend to the process conditions of the fabrication. It is desirable that the magnetic powder has an average particle size ranging from 0.02 to 0.2 µm. When the average particle size is less than 0.02 µm, the saturation magnetization and the coercive force become small, and moreover, a reproduction output of the magnetic recording medium is liable to reduce. On the contrary, when the average particle size exceeds 0.2 µm, there is a tendency that noise generated during high density recording remarkably appears at the time of reproduction. In addition, it is desirable that the coercive force remains within the range of 200 to 2000 (Oe). When the coercive force is less than 200 (Oe), residual of signals recorded in the magnetic recording medium is liable to become insufficient. On the contrary, when the coercive force exceeds 2000(Oe), there is a tendency that writing and erasing of signals with the use of a magnetic head become difficult.

It should be added that the magnetic powder for magnetic recording according to the present invention may be such that e.g., a spinel is deposited on the surface of a particle of each of the aforementioned ferrites or a zinc is solid-solved in each of the aforementioned ferrites.

The magnetic recording medium for magnetic recording according to the present invention is obtained by coating the aforementioned magnetic powder for magnetic recording on a non-magnetic supporting substrate in the presence of a binder resin thereby to form a magnetic layer.

When the magnetic powder is filled in the magnetic layer of the magnetic recording medium by a packing density of 70% or more, preferably 70 to 80%, an excellent recording performance can be obtained without any deterioration of durability within the range where $\Delta$ Hc of the magnetic recording medium is not adversely affected.

For example, a polyurethane resin, a polyester resin, a polyvinyl chloride based resin, a cellulose based resin such as a nitrocellulose based resin or the like or a resin of which terminal end contains a carboxylic group or a polar group such as —$SO_3M$ and —$OSO_3M$ group (M is hydrogen or alkali metal atom) are available as a binder resin employable for the magnetic recording medium of the present invention.

In addition to the aforementioned magnetic powder and the binder resin, additives such as a dispersant, a lubricant, an abrasive, an antistatic agent or the like are added to the magnetic layer by a certain quantity, as desired.

It is necessary that the kind of an abrasive to be employed is selectively determined so as to improve durability of the magnetic recording medium without any deterioration of a recording performance of the same. It is preferable to employ the abrasive having a Morse hardness of 6 or more and an average particle size of 1 µm or less.

$\Delta$ Hc of the coercive force of the magnetic recording medium can be reduced by using the magnetic powder in which a difference between Hc of the magnetic powder and Hc(s) of the same in such a state that the magnetic powder is dispersively deposited on the surface of silica ($SiO_2$) powder particles, i.e., |Hc(s)–Hc| is 100 (Oe) or less. In addition, a more excellent magnetic recording medium can be obtained by properly selecting a quantity of the magnetic powder to be filled, a structure of the magnetic layer and a material constituting the magnetic layer such as a binder resin, a dispersant or the like.

Some of the magnetic recording medium is such that $\Delta$ Hc of the magnetic recording medium is in proportion to or in inverse proportion to increasing/decreasing of the packing density of the magnetic powder to be filled depending not only on the properties of the magnetic powder but also the binder resin constituting the magnetic layer or voids in the magnetic layer.

According to the present invention, even in case that materials with which $\Delta$ Hc enlarges as a packing density of the magnetic powder increases are employed for the binder resin, the dispersant or the like each constituting the magnetic layer of the magnetic recording medium, the packing density of the magnetic powder can be set to 70% or more without significant deterioration on $\Delta$ Hc of the magnetic recording medium, whereby a sufficiently excellent recording performance of the magnetic recording medium can be assured. In such case, it is preferable that the packing density of the magnetic powder is set especially to the range of 70% or more to 80% or less.

In addition, when such materials with which $\Delta$ Hc of the coercive force of the magnetic recording medium reduces as the packing density of the magnetic powder increases are selected and used for the binder resin, the dispersant or the like each constituting the magnetic recording medium, $\Delta$ Hc of the magnetic recording medium can be suppressed to a very low level in cooperation with the effect derived from the magnetic powder for magnetic recording according to the present invention, and, moreover, an excellent recording performance of the magnetic recording medium can be obtained.

The magnetic recording medium of which coercive force has small $\Delta$ Hc while exhibiting an excellent recording performance and for which a plate-shaped magnetic powder having a crystalline anisotropy is used can offer an optimum effect for high density recording especially when the perpendicular magnetization is utilized.

The inventors conducted a number of experiments and discovered based on the results obtained from these experiments that a difference between Hc and Hc(s) had a significant effect on $\Delta$ Hc of the magnetic medium in such a state that it was reserved in an environment having a high temperature and a high moisture, and that $\Delta$ Hc of the coercive force of the magnetic recording medium could be suppressed to a low level by reducing the aforementioned difference.

According to the present invention, since the difference between Hc and Hc(s) is defined to be 100 (Oe) or less (represented by an absolute value), $\Delta$ Hc of the magnetic recording medium can sufficiently be reduced.

In addition, since the magnetic powder for magnetic recording according to the present invention contains an element effective for reducing a temperature coefficient of coercive force, not only $\Delta$ Hc of the magnetic recording medium but also $\delta$ Hc of the magnetic powder and the magnetic recording medium have been sufficiently reduced.

It should be added that $\Delta$ Hc of the magnetic recording medium can additionally be improved by properly adjusting a packing density of the magnetic powder into the magnetic layer, a structure of the magnetic layer or materials such as a binder resin, a dispersant or the like each constituting the magnetic layer.

BEST MODE FOR CARRYING OUT THE INVENTION

Now, the present invention will be described in detail hereinafter with reference to embodiments of the present invention and comparative examples.

EMBODIMENT 1

First, to constitute a Ba ferrite composition to be aimed, starting raw materials such as $BacO_3$, $Fe_2O_3$, CoO, ZnO, NiO, $Nb_2O_5$, $TiO_2$, $SnO_2$ or the like were properly prepared and mixed together. In addition, to form $BaO \cdot B_2O_3$, $BaCO_3$ and $H_3BO_3$ were mixed with the starting raw materials by a predetermined quantity, and thereafter, the resultant mixture was molten at a temperature of 1350° C. Subsequently, the molten material was poured between rotating twin rollers for rapid cooling so as to obtain an amorphous substance. Next, the amorphous substance was heated to an elevated temperature of 800° C. at which it was kept still for five hours, whereby a Ba ferrite crystallized in the matrix.

Next, using an acetic acid, Ba ferrite magnetic powder was segregated from the matrix, and the Ba ferrite magnetic powder was washed using water and then dried. The resultant magnetic powder was M-type Ba ferrite magnetic powder ($BaFe_{10.05}Co_{0.1}Zn_{1.2}Nb_{0.65}O_{19}$), and it was found from the results obtained from particle size measurements conducted based on electron microscopic photographs that an average particle size was very small as represented by about 0.05 μm.

A magnetic recording medium was produced using the magnetic powder obtained in the above-described manner by employing the following process.

| (composition of magnetic coating material) | |
| --- | --- |
| magnetic powder | 100 parts by weight |
| vinyl chloride-vinyl acetate copolymer | 9 parts by weight |
| polyurethane resin containing sulfon group | 6 parts by weight |
| aluminum oxide | 5 parts by weight |
| carbon | 3 parts by weight |
| lubricant | 2 parts by weight |
| dispersant (lecithin) | 2 parts by weight |
| methyl ethyl ketone | 70 parts by weight |
| toluene | 70 parts by weight |
| cyclohexanone | 40 parts by weight |

The magnetic powder was sufficiently dispersed into the solution by stirring together the components constituting the aforementioned magnetic coating material, and thereafter, a polyisocyanate compound was added to the solution by a quantity of 5 parts by weight, whereby a required magnetic coating material was prepared. Subsequently, the magnetic coating material was coated over the surface of a base film having a thickness of 75 μm by actuating a reverse coater and the coated film was subjected to calendering treatment so as to form a magnetic layer having a thickness of 3 μm. Then, the base film having the magnetic layer formed thereon was placed in an oven having a constant temperature in which the magnetic layer was cured, whereby a required magnetic recording medium was obtained.

At this time, a packing density of the magnetic powder for magnetic recording filled in the magnetic layer was 76%. This packing density represents a rate of the magnetic powder (parts by weight) for magnetic recording to the total content of solid material (parts by weight) in the magnetic coating material.

EMBODIMENTS 2 to 12

Magnetic powder for magnetic recording and a magnetic recording medium were obtained in the same manner as the embodiment 1 with the exception that components to be substituted in the magnetic powder differ from those in the embodiment 1 as shown in Table 1.

COMPARATIVE EXAMPLES 1 to 4

Magnetic powder for magnetic recording and a magnetic recording medium were obtained in the same manner as the embodiment 1 with the exception that components to be substituted in the magnetic powder differ from those in the embodiment 1 as shown in Table 1.

EMBODIMENTS 13 to 15

A magnetic recording medium was obtained in the same manner as the embodiment 1 with the exception that a magnetic powder for magnetic recording and a binder resin in a magnetic layer was adjusted so as to adjust a packing density as shown in Table 2.

EMBODIMENT 16

A magnetic recording medium was obtained in the same manner as the embodiment 5 with the exception that a magnetic powder for magnetic recording and a binder resin filled in a magnetic layer was adjusted so as to adjust a packing density as shown in Table 2.

COMPARATIVE EXAMPLES 5 to 7

A magnetic recording medium was obtained in the same manner as the comparative example 2 with the exception that a magnetic powder for magnetic recording and a binder resin filled in a magnetic layer was adjusted so as to adjust a packing density as shown in Table 2.

Properties of the magnetic powder for magnetic recording and the magnetic recording medium obtained not only in accordance with the embodiments 1 to 12 but also in accordance with the comparative examples 1 to 4 were measured. The results obtained from the measurements are shown in Table 1. The value of a substitution quantity in the table is a substitution quantity per a single chemical formula mentioned above.

It should be noted that Hc of the magnetic powder, saturation magnetization and δ Hc of the coercive force were measured in a maximum applied magnetic field 10 (kOe) with the aid of a vibrating sample magnetometer (VSM), and moreover, δ Hc (Oe/° C.) of the coercive force was determined based on a formula of $(Hc(T_1)-Hc(T_2))/(T_1-T_2)$ ($Hc(T1)$ designates the coercive force at temperature T1, and $Hc(T2)$ designates the coercive force at temperature T2. In these examples, $T_1$ was 60° C. and $T_2$ was 20° C.). In addition, δ Hc of the magnetic recording medium was measured in the same manner as mentioned above. Since the results of δ Hc of the magnetic recording medium obtained from the measurements exhibit the substantially same value as those of δ Hc of the magnetic powder, representation of the result is neglected in Table 1 for the purpose of simplification. Further, a difference between Hc and Hc(s) was determined based on Hc(s) which was measured in the following manner.

Hc(s) was measured while the magnetic powder was dispersively deposited on the surface of silica ($SiO_2$) powder particles. Specifically, the magnetic powder of 0.1 g was first dispersed in water of 100 cc under the influence of supersonic applied to the water. Then, 5 g of the silica ($SiO_2$) powder ("FEC silica" produced by Tama Chemical Industries Co., Ltd.: A grain size distribution recognized from observation of an electron microscopic photograph ranged from about 0.1 to 1.5 μm and an average particle size was about 0.5 μm) was added to the water and the resultant mixture was then stirred under the influence of supersonic applied to the water, whereby the respective magnetic powder particles were deposited on the surface of silica ($SiO_2$) powder particles. After completion of the deposition, both the silica ($SiO_2$) powder and the magnetic powder deposited on the former Here dried. Subsequently, a coercive force of the silica ($SiO_2$) dispersively deposited by magnetic powder particles was measured with the aid of a vibrating sample magnetometer (VSM) so as to determine Hc(s).

Additionally, Δ Hc of the magnetic recording medium in an environment having a high temperature and a high moisture was represented by (Hc(m)'−Hc(Hm)), wherein Hc(m) designated the coercive force of the magnetic recording medium measured after the thus prepared magnetic recording medium was placed in an oven having a constant temperature and a constant moisture for one week under working conditions at a temperature of 60° C. and moisture of 90%, and Hc(m) designated an initial coercive force of the magnetic recording medium before it was placed in the oven.

Also with respect to the embodiments 13 to 16 and the comparative examples 5 to 7, Δ HC of the magnetic recording medium was measured by employing the same process as mentioned above. The results obtained from the measurements are shown in Table 2.

Each magnetic recording medium was punched to produce a circular disc having a diameter of 3.5 inches, and a center core was attached to the central part of the circular disc. An assembly of the circular disc and the center core was received in a jacket to serve as a floppy disc having a 3.5 inch size. While the foregoing state was maintained, an output and durability were measured with the resultant floppy disc. The results obtained from the measurements are shown in Table 2.

An output from the floppy disc was evaluated using a MIG (Metal-In-Gap) head while an optimum electric current was fed to the head at a recording density of 35 kFRPI. In addition, durability of the floppy disc was evaluated using track 12 specified in accordance with JIS in a cyclic environment having a low temperature/low moisture environment comprising a temperature of 5° C. and a moisture of 10% and a high temperature/high moisture environment comprising a temperature of 60° C. and a moisture of 90% periodically shifted to each other at every frequency of 24 hours wherein each evaluation was basically conducted when the output was reduced to a level of 70% relative to an initial output or when some surface flaws were recognized by visual observation.

Experiments were conducted to provide further comparative examples which relate to certain prior art mainly directed to resisting the deterioration of recording and reproduction from substantial temperature changes, in order to demonstrate the differences of the embodiments according to the invention in resisting deterioration of recording and reproduction from long-term storage or use.

COMPARATIVE EXAMPLE 8

An aqueous solution containing 0.5 mol of $Ba^{2+}$, 5 mol of $Fe^{3+}$, 0.25 mol of $Ti^{4+}$ and 37.5 mol of NaOH was heated and stirred at 300° C. for 3 hours in an autoclave. Thereafter, a reaction product was filtered and the resulting precipitate was washed with water and dried. Then, 100 grams of the obtained powder were dispersed and stirred in a water solution containing 0.12 mol of $Zn^{2+}$ and filtered and dried. The dried powder was heat-treated at 900° C. for 1 hour. Thus, Ba ferrite magnetic powder was obtained.

Next, 0.1 g. of the magnetic particles was dispersed in 100 cc. of water by using ultrasonic vibration. Then, 5 g. of silica powder having a grain size in the range of 0.1 to 1.5 μm and an average particle diameter of 0.5 μm was added to the water containing the magnetic particles and stirred by ultrasonic vibration. As a result, respective magnetic particles were deposited on the surfaces of silica powder particles. Then, the silica powder particles and the magnetic particles deposited thereon were dried. Subsequently, a coercive force $H_c(s)$ of the silica dispersively deposited magnetic particles was measured using a vibrating sample magnetometer (VSM). A coercive force $H_c$ of magnetic particles not so dispersed was measured according to a conventional method.

Thus, the difference between the coercive force $H_c(s)$ and the coercive force $H_c$ with respect to the Ba ferrite magnetic powder was measured. The difference was 130 Oe, which value exceeds 100 Oe.

COMPARATIVE EXAMPLE 9

First, 195 g. of $BaCO_3$, 1,070 g. of $Fe_3O_4$, 131.8 g. of ZnO and 116.2 g. of $TiO_2$ and a flux comprising 250 g. of NaCl and 250 g. of $Na_4SiO_4$ were mixed and supplied into a crucible and heated and calcined at 800° C. for 1.5 hours. The calcined product was crushed and washed with water. The washed product was filtered and dried to obtain Ba ferrite magnetic particles.

The difference between the coercive force $H_c(s)$ and the coercive force $H_c$ with respect to the Ba ferrite magnetic powder was measured, as in Comparative Example 8. The difference was 120 Oe, which value exceeds 100 Oe.

COMPARATIVE EXAMPLE 10

An aqueous solution containing 0.087 mol of $Ba^{2+}$, 0.80 mol of $Fe^{3+}$, 0.082 mol of $Co^{2+}$ and 0.164 mol of $Ti^{4+}$ was added to an aqueous solution of NaOH and reacted in an autoclave at 300° C. for 2 hours. The reacted product was washed with water and filtered and dried. The dried product was heat-treated at 500° C. for four hours to obtain Ba ferrite magnetic particles.

Then, the difference between the coercive force $H_c(s)$ and the coercive force $H_c$ with respect to the Ba ferrite magnetic powder was measured, as in Comparative Example 8. The difference was 130 Oe, which value exceeds 100 Oe.

COMPARATIVE EXAMPLE 11

First, 147.4 g. of $H_3BO_3$, 283.2 g. of $BaCO_3$, 169.8 g. of $Fe_2O_3$, 13.1 g. of CoO and 14.0 g. of $TiO_2$ were mixed so as to obtain a magnetic powder having a composition of 29.5 mol % of $B_2O_3$, 35.5% mol % of BaO, 26.3 mol % of $Fe_2O_3$, 4.34 mol % of CoO and 4.34 mol % of $TiO_2$. The mixture was heated at 1300° C. to form a melted glass. The melted glass was poured on a rotating double roll to be quickly cooled so as to obtain an amorphous product. Thereafter, the amorphous product was heat-treated at 800° C. for 10 hours, washed with acetic acid, further washed repeatedly with water containing 20 ppm of sulfate ion, and dried to obtain magnetic particles.

The difference between the coercive force $H_c(s)$ and the coercive force $H_c$ with respect to the Ba ferrite magnetic powder was measured, as in Comparative Example 8. The difference was 140 Oe whose value exceeds 100 Oe.

As is apparent from Table 1, since elements effective for reducing the temperature coefficient of coercive force while holding the coercive force within the desired range are substituted in the magnetic powder for magnetic recording in each of the embodiments, each δ Hc is suppressively reduced to a lower level.

In addition, it is apparent that Δ Hc of the magnetic recording medium in each of the embodiments is suppressively reduced to a very low level compared with the comparative examples. Obviously, for the embodiments according to the invention, the smaller the difference between Hc and Hc(s), the smaller Δ Hc of the magnetic recording medium.

In such manner, it is apparent that the magnetic powder for magnetic recording in each of the embodiments has a small δ Hc, and moreover, the coercive force of the magnetic recording medium having the magnetic powder in each of the embodiments employed therefor has excellent stability because Δ Hc of the magnetic recording medium is also suppressively reduced to a very low level.

force, and moreover, exhibit a high functional reliability at all times, they can practically be employed in many industrial application fields where the aforementioned excellent properties have been required.

TABLE 1

| | | SUBSTITUTION ELEMENT (SUBSTITUTION QUANTITY PER A SINGLE CHEMICAL FORMULA) | | | | | | COERCIVE FORCE OF MAGNETIC POWDER | TEMPERATURE COEFFICIENT OF COERCIVE FORCE OF MAGNETIC POWDER | SATURATION MAGNETIZATION OF MAGNETIC POWDER | Hc(S)-Hc | VARIATION OF COERCIVE FORCE OF MAGNETIC RECORDING MEDIUM WITH TIME |
|---|---|---|---|---|---|---|---|---|---|---|---|---|
| | | Co | Zn | Ni | Nb | Ti | Sn | Hc(Oe) | δHc (Oe/°C.) | (emu/g) | (Oe) | ΔHc (Oe) |
| EMBODIMENT | 1 | 0.1 | 1.2 | 0 | 0.65 | 0 | 0 | 870 | −0.8 | 53 | 5 | 0 |
| | 2 | 0.1 | 0.8 | 0 | 0.45 | 0 | 0 | 1580 | −0.1 | 58 | 10 | 5 |
| | 3 | 0.2 | 0.8 | 0 | 0.50 | 0 | 0 | 1240 | 1.2 | 58 | 10 | 10 |
| | 4 | 0 | 1.3 | 0 | 0.65 | 0 | 0 | 910 | −2.7 | 50 | 0 | 0 |
| | 5 | 0.1 | 0.8 | 0 | 0.15 | 0 | 0.6 | 710 | 0.3 | 54 | −5 | 0 |
| | 6 | 0 | 0.9 | 0 | 0.15 | 0 | 0.6 | 740 | −0.1 | 51 | 0 | 0 |
| | 7 | 0.1 | 0.9 | 0 | 0 | 1.0 | 0 | 1390 | −0.4 | 57 | 10 | 10 |
| | 8 | 0 | 1.2 | 0 | 0 | 1.2 | 0 | 1150 | −2.8 | 51 | 5 | 5 |
| | 9 | 0.1 | 0.8 | 0 | 0 | 0.5 | 0.4 | 810 | 0.4 | 54 | 10 | 10 |
| | 10 | 0 | 0.9 | 0 | 0 | 0.5 | 0.4 | 860 | 0.1 | 50 | 5 | 10 |
| | 11 | 0.2 | 0 | 1.0 | 0.6 | 0 | 0 | 1240 | −0.8 | 54 | 10 | 10 |
| | 12 | 0.2 | 0 | 1.0 | 0 | 1.2 | 0 | 1030 | 0.1 | 53 | 20 | 15 |
| COMPARATIVE EXAMPLE | 1 | 0.8 | 0 | 0 | 0 | 0.8 | 0 | 870 | 4.5 | 57 | 130 | 40 |
| | 2 | 0.9 | 0 | 0 | 0.45 | 0 | 0 | 840 | 4.7 | 59 | 120 | 40 |
| | 3 | 0.8 | 0 | 0 | 0.10 | 0 | 0.6 | 860 | −0.2 | 57 | 130 | 45 |
| | 4 | 0.8 | 0 | 0 | 0 | 0.4 | 0.4 | 880 | 0.4 | 56 | 140 | 45 |

Further, it is also apparent from the aforementioned embodiments that it is preferably employable to adjust the coercive force of the magnetic powder containing Co, since in the embodiment of the magnetic powder not containing Co, the saturation magnetization is liable to become small compared with the embodiment of the magnetic powder containing Co, and moreover, there is recognized a behavior that an absolute value representing δ Hc is enlarged to the negative side.

Additionally, it is apparent from Table 2 that with respect to the magnetic powder for magnetic recording in each of the embodiments, Δ Hc of the magnetic recording medium is kept still small no matter how a packing density of the magnetic powder filled in the magnetic recording medium is increased. When this packing density is 70% or more, a very excellent recording performance can be obtained.

In addition to the aforementioned embodiments, another magnetic layer may be constructed by additionally applying a magnetic field for orientation so as to increase squareness ratio in the perpendicular direction. This construction makes it possible to allow the magnetic recording medium to exhibit magnetic recording with higher recording density.

INDUSTRIAL APPLICABILITY

As described above, according to the present invention, since the magnetic powder for magnetic recording and the magnetic recording medium having the magnetic powder used therefor have excellent stability in respect of a coercive

TABLE 2

| | PACKING DENSITY (%) | OUTPUT (dB) | DURABILITY (HUNDRED-HUNDRED PASSES) | VARIATION OF COERCIVE FORCE OF MAGNETIC RECORDING MEDIUM WITH TIME ΔHc (Oe) |
|---|---|---|---|---|
| EMBODIMENT | | | | |
| 1 | 76 | +2.0 | 1320 | 0 |
| 13 | 70 | +1.0 | 1600 | 0 |
| 14 | 72 | +1.5 | 1610 | 0 |
| 15 | 80 | +3.0 | 800 | 10 |
| 5 | 76 | +1.5 | 1410 | 0 |
| 16 | 80 | +2.5 | 1020 | 10 |
| COMPARATIVE EXAMPLE | | | | |
| 2 | 76 | +2.0 | 1130 | 40 |
| 5 | 65 | 0 | 1180 | 20 |
| 6 | 80 | +3.0 | 600 | 45 |
| 7 | 85 | +3.5 | 120 | 60 |

What is claimed is:

1. A method for providing a magnetic powder for magnetic recording, comprising the steps of:

producing magnetic powders each comprising a hexagonal ferrite represented by the chemical formula $AO \cdot n(Fe_{12-X-Y-Z}CO_XM(I)_YM(II)_ZO_{18-\alpha})$, wherein A designates at least one kind of metallic element selected from a group consisting of Ba, Sr. Pb, and Ca, n designates a numeral of 0.7 to 4, M(I) designates at least one kind of metallic element selected from Zn and Ni, M(II) designates at least one kind of metallic element selected from quadrivalent metallic elements to hexavalent metallic elements, X designates a numeral of 0 to 0.7, Y designates a numeral of 0.5 to 2.0, Z designates a numeral greater than zero and represents an atomic proportion of the represented element that compensates or partially compensates an atomic proportion of a formula constituent having an ionic valence, and $\alpha$ designates a numeral of 0 or more than 0, each said powder having a respective coercive force $H_c$ at room temperature;

dispersively depositing particles of each magnetic powder on silica test particles larger than the particles of the magnetic powder, on which test particles coercive force becomes a respective coercive force $H_c(s)$ of the dispersively deposited particles at room temperature, said silica test particles having an average particle size within the range of 0.1 to 5 μm, the ratio of the total quantity of silica particles to the total quantity of magnetic powder particles providing that the total sum of the surface areas of the silica test particles is larger than the total sum of the adherent surface areas of the magnetic powder particles; and selecting a magnetic powder for use in a magnetic recording medium when the difference between the coercive force $H_c$ of the magnetic powder at room temperature and the coercive force $H_c(s)$ of the dispersively deposited particles of the magnetic powder at room temperature is 100 Oe or less.

2. The method for providing a magnetic powder for magnetic recording as claimed in claim 1, wherein A is Ba, the particles of the magnetic powder being particles of barium ferrite, wherein the step of dispersively depositing includes the step of dispersively depositing the particles of the magnetic powder on silica ($SiO_2$) particles.

3. The method for providing a magnetic powder for magnetic recording as claimed in claim 1, wherein an average diameter of particles of each magnetic powder is in the range from 0.02 to 0.2 micrometers.

4. The method for providing a magnetic powder for magnetic recording as claimed in claim 1, wherein an average diameter of particles of each magnetic powder is not more than 0.05 micrometers.

5. The method for providing a magnetic powder for magnetic recording according to claim 1, wherein the selecting step includes selecting the magnetic powder for use in a magnetic recording medium when the difference between the coercive force ($H_c$) of the magnetic powder at room temperature and the coercive force ($H_c(s)$) of the magnetic powder at room temperature is not more than 15 Oe.

6. The method for providing a magnetic powder for magnetic recording as claimed in claim 1, wherein the step of dispersively depositing includes the step of dispersing the particles of the magnetic powder on the silica test particles having an average particle diameter within the range from 0.1 to 0.5 micrometers.

7. The method for providing a magnetic powder for magnetic recording as claimed in claim 6, wherein A is Ba, the particles of the magnetic powder being particles of barium ferrite, wherein the step of dispersively depositing includes the step of dispersively depositing the particles of the magnetic powder on silica ($SiO_2$) particles.

8. The method for providing a magnetic powder for magnetic recording as claimed in claim 6, wherein an average diameter of particles of each magnetic powder is not more than 0.05 micrometers.

9. The method for providing a magnetic powder for magnetic recording as claimed in claim 6, wherein an average diameter of particles of each magnetic powder is in the range from 0.02 to 0.2 micrometers.

10. The method for selecting a magnetic powder for magnetic recording according to claim 6, wherein the selecting step includes selecting the magnetic powder for use in a magnetic recording medium when the difference between the coercive force $H_c$ of the magnetic powder at room temperature and the coercive force $H_c(s)$ of the magnetic powder at room temperature is not more than 15 Oe.

* * * * *